US011784873B2

United States Patent
Yang et al.

(10) Patent No.: US 11,784,873 B2
(45) Date of Patent: Oct. 10, 2023

(54) ULTRA-RELIABLE AND LOW LATENCY COMMUNICATIONS LOCAL BREAKOUT METHOD AND SYSTEM FOR NEXT GENERATION RADIO ACCESS NETWORK

(71) Applicant: WISTRON NEWEB CORPORATION, Hsinchu (TW)

(72) Inventors: Jen-Shun Yang, Hsinchu (TW); Kuang-Yuan Hsu, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 141 days.

(21) Appl. No.: 17/505,714

(22) Filed: Oct. 20, 2021

(65) Prior Publication Data

US 2022/0345361 A1 Oct. 27, 2022

(30) Foreign Application Priority Data

Apr. 27, 2021 (TW) .................................. 110115129

(51) Int. Cl.
*H04L 41/0803* (2022.01)
*H04L 45/745* (2022.01)
*H04W 28/02* (2009.01)
*H04L 45/02* (2022.01)
*H04L 12/66* (2006.01)
*H04W 76/10* (2018.01)

(52) U.S. Cl.
CPC .......... *H04L 41/0803* (2013.01); *H04L 12/66* (2013.01); *H04L 45/026* (2013.01); *H04L 45/745* (2013.01); *H04W 28/0252* (2013.01); *H04W 76/10* (2018.02)

(58) Field of Classification Search
CPC ... H04L 41/0803; H04L 12/66; H04L 45/026; H04L 45/745; H04W 28/0252; H04W 76/10
See application file for complete search history.

(56) References Cited

U.S. PATENT DOCUMENTS

| | | | |
|---|---|---|---|
| 8,385,290 B2 | 2/2013 | Kato et al. | |
| 2017/0366618 A1* | 12/2017 | Vrzic | ................... H04L 67/148 |
| 2019/0373454 A1 | 12/2019 | Jing et al. | |

(Continued)

FOREIGN PATENT DOCUMENTS

| | | |
|---|---|---|
| WO | 2009070061 A1 | 6/2009 |
| WO | 2021021621 A1 | 2/2021 |

*Primary Examiner* — Jackie Zuniga Abad
(74) *Attorney, Agent, or Firm* — McClure, Qualey & Rodack, LLP (57) ABSTRACT

An ultra-reliable and low latency communications local breakout (URLLC-LBO) method and a URLLC-LBO method for a next generation radio access network (NG-RAN) are provided. The method includes: configuring a core network to establish a packet data unit (PDU) session between first user equipment (UE) and the core network; configuring the first UE to establish a URLLC service; configuring a near real-time RAN intelligent controller (near-RT RIC) to establish an F1-LBO routing process to set an LBO dedicated radio bearer (DRB) for the local URLLC service; configuring an F1-LBO virtual network function (VNF) module according to a traffic rule by the F1-LBO routing process, to establish a routing table through the F1-LBO VNF module, in which the routing table defines a relationship between a first location and a second location of the LBO DRB.

14 Claims, 7 Drawing Sheets

(56) References Cited

U.S. PATENT DOCUMENTS

2020/0259896 A1\* 8/2020 Sachs ................... H04J 3/0667
2021/0258866 A1\* 8/2021 Chou ................... H04W 48/16
2022/0086864 A1\* 3/2022 Sabella ............... H04L 41/0895

\* cited by examiner

ULTRA-RELIABLE AND LOW LATENCY COMMUNICATIONS LOCAL BREAKOUT METHOD AND SYSTEM FOR NEXT GENERATION RADIO ACCESS NETWORK

CROSS-REFERENCE TO RELATED PATENT APPLICATION

This application claims the benefit of priority to Taiwan Patent Application No. 110115129, filed on Apr. 27, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a local breakout (LBO) method and an LBO system, and more particularly to an ultra-reliable and low latency communications local breakout (URLLC-LBO) method and a URLLC-LBO system for a next generation radio access network (NG-RAN).

BACKGROUND OF THE DISCLOSURE

Due to the rise of private 5G networks, needs of enterprises in network requirements such as enhanced mobile broadband (eMBB), ultra-reliable and ultra-low latency (URLLC), massive internet of things (mIOT) and data privacy can be met.

In the above network requirements, URLLC and data privacy are important incentives for enterprises when considering whether or not to build a private 5G network. Therefore, a multi-access edge computing (MEC) network having a local breakout (LBO), otherwise referred to as a local business operation, has become the most important network module.

The MEC provides a virtualized execution platform for hardware, such that a data link layer (L2)/radio resource control layer (L3) centralized unit/distributed unit (CU/DU), or even part of the 5G core network (5GC) virtual network software defined in the 5G transmission specification can be configured in the MEC, and virtual local operation application server software of the enterprises can also be installed in the MEC.

By using an LBO connection established by an internal user plane function (I-UPF) of the MEC to direct an internal private service of an enterprise to the virtual local operation application server software, not only can the delay be reduced, but confidential information can be prevented from being leaked, the LBO of this structure being called an I-UPF LBO.

However, this I-UPF LBO may still have a large delay of more than 1 ms for an end-to-end communication of two terminals, and is not conducive for high synchronization demand services such as smart factories or smart transportation. Therefore, an F1 interface (an interface between the DU and the CU) LBO (F1-LBO) with lower delays is required.

Current standard specifications do not support a standard F1-LBO. In general, the existing LBOs are vendor-specific proprietary solutions, and the proposed method does not need to establish a user plane function (UPF) packet data network (PDN) session through a $3^{rd}$ generation partnership project (3GPP) 5GC control plane (CP), which may cause insufficient management and safety issues.

SUMMARY OF THE DISCLOSURE

In response to the above-referenced technical inadequacies, the present disclosure provides an ultra-reliable and low latency communications local breakout (URLLC-LBO) method and a URLLC-LBO system complying with $3^{rd}$ generation partnership project (3GPP) 5G core network (5GC) connection process.

In one aspect, the present disclosure provides a URLLC-LBO method for a next generation radio access network (NG-RAN), and the URLLC-LBO method includes: configuring a core network to establish a packet data unit (PDU) session between first user equipment (UE) and the core network, in which the PDU session passes through a radio unit (RU), a first distributed unit (DU) and a central unit (CU) between the first UE and the core network; configuring the first UE to establish a local ultra-reliable and low latency communications (URLLC) service; configuring a near real-time radio access network intelligence controller (near-RT RIC) to establish an F1 local breakout (F1-LBO) routing process to set a local breakout dedicated radio bearer (LBO DRB) for the local URLLC service; configuring an F1-LBO virtual network function (VNF) module according to a traffic rule by the F1-LBO routing process, to establish a routing table through the F1-LBO VNF module, in which the routing table defines a relationship between a first location and a second location of the LBO DRB, the first location is a first tunnel endpoint identifier (TEID) of the first UE, and the second location is a second TEID of a second UE or an Internet protocol (IP) address of a multi-access edge computing (MEC) device; and configuring the F1-LBO VNF module to establish an F1-LBO session between the first UE and the second UE according to the routing table, or to establish the F1-LBO session between the first UE and a virtual central unit (vCU) user plane (UP) executed by the MEC device according to the routing table.

In another aspect, the present disclosure provides a URLLC-LBO for a next generation radio access network (NG-RAN), and the URLLC-LBO system includes first user equipment (UE), a core network, a radio unit (RU), a first distributed unit (DU), a central unit (CU), a near real-time radio access network intelligence controller (near-RT RIC) and an F1-LBO virtual network function (VNF) module. The first UE is configured to establish a local ultra-reliable and low latency communications (URLLC) service. The core network is configured to establish a packet data unit (PDU) session between the first UE and the core network. The RU is connected between the first UE and the core network. The first DU is connected between the RU and the core network. The CU is connected between the first DU and the core network. The near-RT RIC is configured to establish an F1 local breakout (F1-LBO) routing process to set a local breakout dedicated radio bearer (LBO DRB) for the local URLLC service. The F1-LBO VNF module is connected between the first DU and the CU. The F1-LBO routing process is executed to configure the F1-LBO VNF module according to a traffic rule to establish a routing table, the routing table defines a relationship between a first location and a second location associated with the LBO DRB. The first location is a first tunnel endpoint identifier (TEID) of the first UE, and the second location is a second TEID of a second UE or an Internet protocol (IP) address of a multi-access edge computing (MEC) device. The F1-LBO VNF module is further configured to establish an F1-LBO session for the LBO DRB between the first UE and the second UE according to the routing table, or to establish the F1-LBO session between the first UE and a virtual central unit (vCU) user plane (UP) executed by the MEC device according to the routing table.

Therefore, the URLLC-LBO method and the URLLC-LBO system for the NG-RAN provided by the present disclosure are suitable for the F1 interface between the CU and the DU, can support lower microsecond-level application requirements, and can comply with 3GPP NG-RAN and 5GC standards, therefore, the URLLC-LBO method and the URLLC-LBO system can comply with open-radio access network (O-RAN) working group 3 near-RT RIC management interface standard to establish F1-LBO shortcuts without modifying the original network equipment and user equipment (UE) and user plane function (UPF) packet data network (PDN) session maintaining mechanism.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 1:
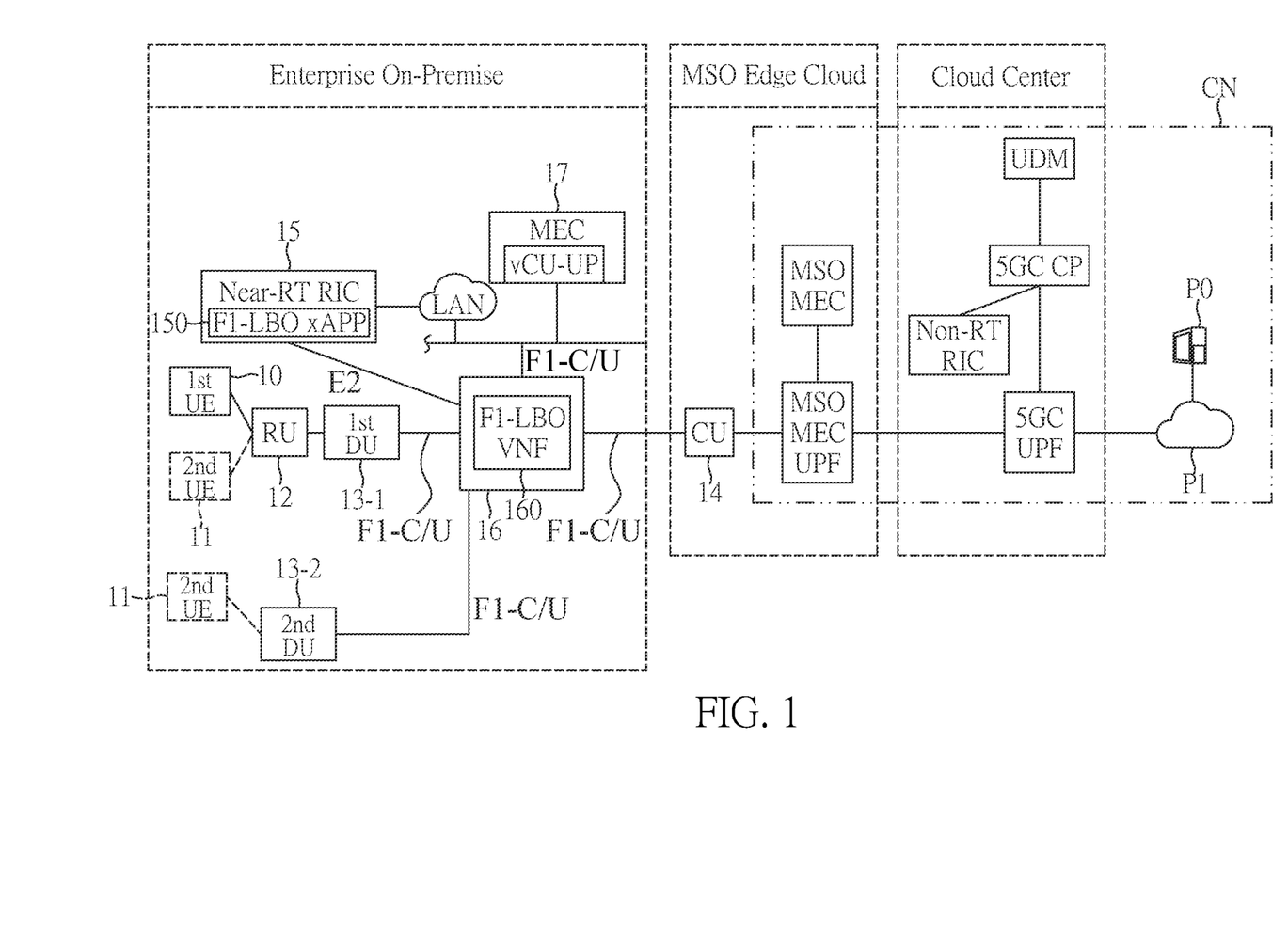
FIG. 1 is a functional block diagram of a local breakout (LBO) system according to a first embodiment of the present disclosure.

FIG. 1 is a functional block diagram of a local breakout (LBO) system according to a first embodiment of the present disclosure. Referring to FIG. 1, a first embodiment of the present disclosure provides an ultra-reliable and low latency communications local breakout (URLLC-LBO) system 1 for a next generation radio access network (NG-RAN), and the URLLC-LBO system 1 includes first user equipment (UE) 10, a core network CN, a radio unit (RU) 12, a first distributed unit (DU) 13-1, a central unit (CU) 14, a near real-time radio access network intelligence controller (near-RT RIC) 15, an F1 gateway 16, and a multi-access edge computing (MEC) device 17.

Figure 2:
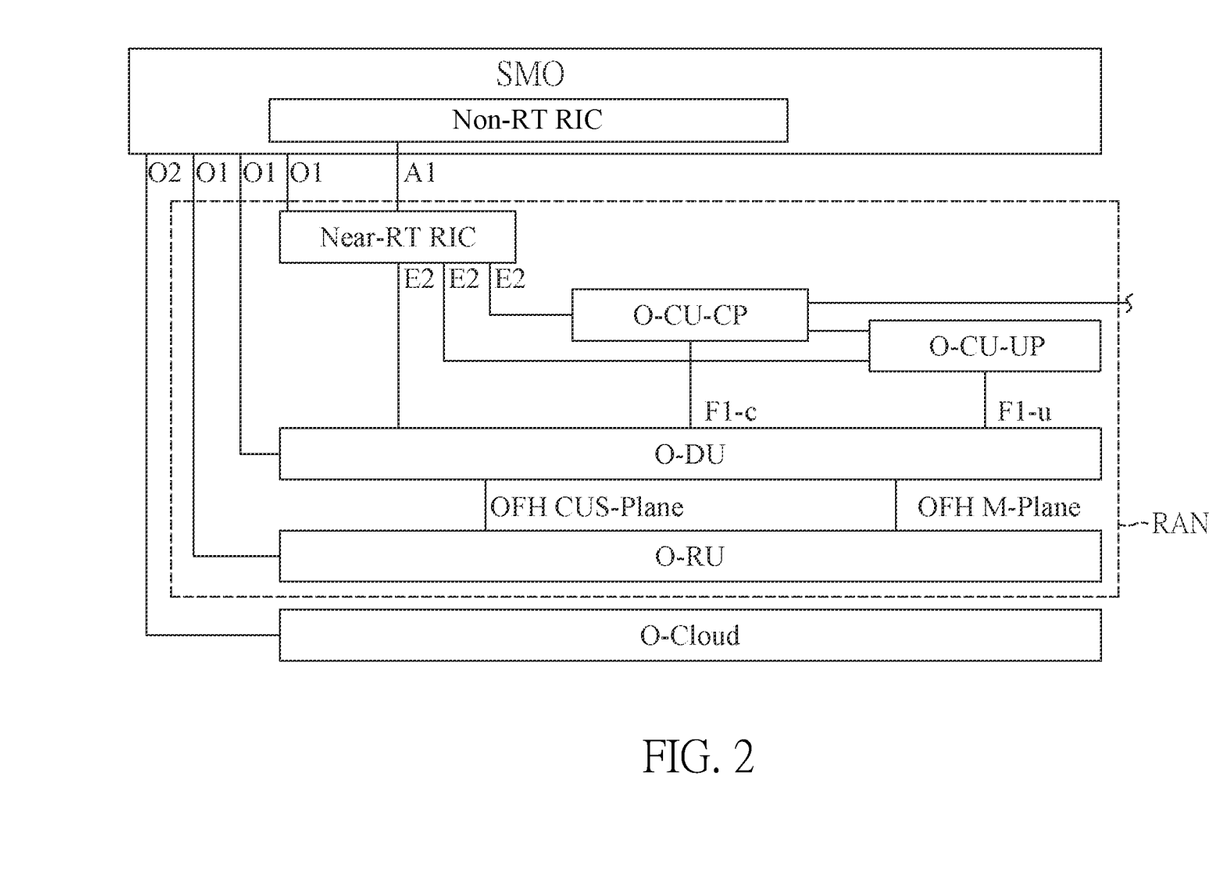
FIG. 2 is a schematic diagram of an open-radio access network (O-RAN) architecture according to the first embodiment of the present disclosure.

Reference is also made to FIG. 2, which is a schematic diagram of an open-radio access network (O-RAN) architecture according to the first embodiment of the present disclosure. In short, the system and method provided by the present disclosure are mainly based on a 5G O-RAN architecture. In the past, technical difficulties of 2G/3G access networks were relatively low, and 2G/3G access networks were usually integrated and built into the same architecture. As for 5G, a three-tier architecture of RU, DU, and CU is defined. The standardization of the three-tier architecture is called an O-CU, an O-DU, and an O-RU by the O-RAN alliance. In FIG. 2, a prefix "O-" of each element (CU, DU, RU) of a 3GPP architecture represents that it supports newly added interfaces and functions of O-RAN.

It should be noted that the devices, units, networks, modules, and gateways mentioned in the present disclosure can all be implemented in the form of hardware, software or firmware. When the devices, units, networks, modules, and gateways mentioned in the present disclosure are implemented in hardware, the hardware can include memories, processors, and network interfaces included in a general computer system. When the devices, units, networks, modules, and gateways mentioned in the present disclosure are implemented in software or firmware, the software or firmware can be stored in the memories of the aforementioned computer system and functions thereof can be executed by the processors.

In the O-RAN architecture, the O-CU is responsible for the packet data convergence protocol (PDCP) layer, the O-DU is responsible for all baseband processing, scheduling, radio link control (RLC), medium access control (MAC) and physical layer (PHY), and the O-RU is responsible for components used for processing physical layer, including analog components of wireless transmitters and receivers.

In the architecture of FIG. 1, the RU 12, the first DU 13-1 and the CU 14 are connected between the first UE 10 and the core network CN. The core network CN can include a multi-system operator (MSO) MEC and an MSO MEC user plane function (UPF) in an MSO edge cloud, a 5G core (5GC) UPF, a 5GC control plane (CP), a unified data management (UDM) and a non-real-time radio access network intelligent controller (non-RT RIC) in a cloud center, and a public service P1 provided by a public server P0.

Before describing the near-RT RIC 15, it is necessary to explain a service management and orchestration framework (SMO) architecture. Reference can be made to FIG. 2, and the system architecture proposed by O-RAN, based on the 3GPP radio access network (RAN) architecture, adds functions including the SMO, the non-RT RIC, the near-RT RIC, and O1, O2, A1, and E2 interfaces, while supporting mechanisms of smart control. The O-DU is connected to a CP of the O-CU through an F1-c interface, and is connected to a user plane (UP) of the O-CU through an F1-u interface.

The SMO is set in the cloud center, which is a management center of a 5G network. The SMO provides management services, management interfaces and management content of network facilities, including the O1 interface, the O2 interface and an open fronthaul (OFH) M-Plane interface. The O1 interface is used for fault, configuration, accounting, performance, security (FCAPS) management, and the O2 interface is used for O-Cloud resource and load management. The OFH M-Plane interface and an OFH CUS-Plane interface are used to manage the O-RU.

On the other hand, the non-RT RIC is located in the SMO, and functions of the non-RT RIC include data analysis, training machine learning models, providing enrichment information, and setting policy. The data analysis and training machine learning model functions of the non-RT RIC can obtain RAN-related data from the SMO, and can obtain user-related data from an application server. This function can also apply machine learning methods for individual purposes to train an identification or prediction model in an off-line manner, and deploy the machine learning models in the near-RT RIC, which can actively adjust or adjust in advance a network resource allocation in response to changes in traffic and environment. The A1 interface can be used to set guidelines for an individual user or a group of users, such as QoE goals, preferred cells or frequency bands. A setting or adjustment cycle of guidelines of the A1 interface has a response time or interval of more than 1 second, and is hence referred to as "non-real time" (as opposed to "near-real time").

In addition, the near-RT RIC is located in the RAN, and receives and analyzes real-time information from the RAN. The near-RT RIC combines additional information provided by the non-RT RIC, and uses the machine learning model deployed by the non-RT RIC to monitor or predict changes in user connection status. When the policy set by the non-RT RIC cannot be followed, RAN parameters need to be adjusted, such as adjusting resource allocation, transmission rate, transmission priority, switching connection points, handovers, and the like, such that each user can continue to maintain the established policy.

The near-RT RIC can adjust the RAN through the E2 interface. Since the near-RT RIC can monitor near real-time network conditions, a response time and a cycle controlled by the E2 interface are within 1 second. As shown in FIG. 2, in the near-RT RIC, an application program (xApp) can be executed to monitor data and adjust parameters of RAN functions for different application scenarios, and the present disclosure executes an F1-LBO routing process (xApp) 150 through the near-RT RIC to achieve LBO functions of the F1 interface.

In the first embodiment, the F1-LBO VNF module 160 is executed by the F1 gateway 16. The F1 gateway 16 is connected to the first DU 13-1, the CU 16 and the MEC device 17 through an F1-C/U interface, and is connected to the near-RT RIC 15 through the E2 interface. The near-RT RIC 15 and the MEC device 17 can be connected via a local area network (LAN). In this embodiment, the F1 gateway 16 can be connected to a plurality of DUs through the F1-C/U interface, for example, the F1 gateway 16 can be connected to a second DU 13-2, and the second UE 11 can also be connected to the second DU 13-2, such that the F1 gateway 16 can be used to implement an F1-LBO between the plurality of DUs.

The MEC device 17 can provide a virtualized execution platform for hardware, such that a data link layer (L2), CU/DU of radio resource control layer (L3), or even part of the 5G core network virtual network software can be set in the MEC, and virtual local operation application server software of the enterprises can also be installed in the MEC. The MEC device 17 can provide a virtual central unit user plane (vCU-UP) 170 that is a virtual CU provided by the MEC device 17 and that only executes a UP, and this virtual CU does not perform any action of a CP.

Figure 3:
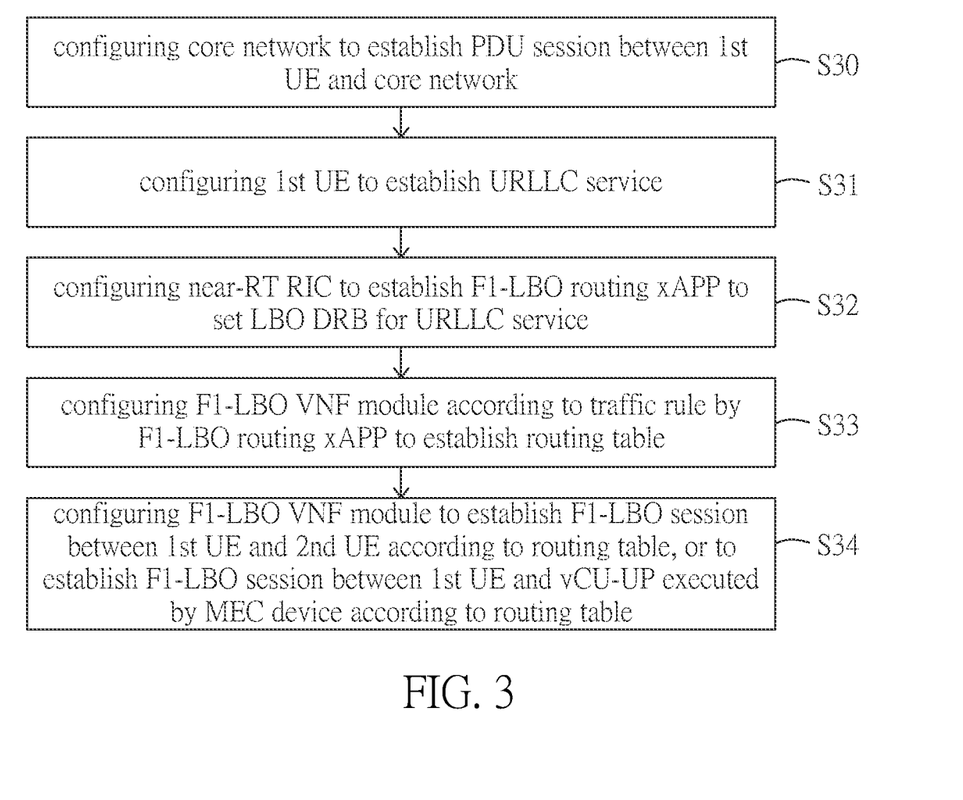
FIG. 3 is a flowchart of an ultra-reliable and low latency communications local breakout (URLLC-LBO) method according to an embodiment of the present disclosure.

Based on this architecture, the URLLC-LBO method provided by the present disclosure is further explained. Reference is made to FIG. 3, which is a flowchart of a URLLC-LBO method according to an embodiment of the present disclosure. As shown in FIG. 3, the URLLC-LBO method includes:

Step S30: configuring the core network CN to establish a packet data unit (PDU) session between the first UE 10 and the core network CN.

The following describes the PDU session first. In 5G networks, data sent and received between user equipment and external networks are transmitted in a form of data packets, and these data packets are usually called PDUs. In 5G networks, a path established between UEs and external networks is called a PDU session, and the PDU session will pass through the RU 12, the first DU 13-1, and the CU 14.

Step S31: configuring the first UE 10 to establish a URLLC service. In brief, this URLLC service is set to a request that can be completed within a delay of less than 1 ms, and an applicable scenario of the URLLC service can be, for example, a service that transmits messages between multiple UEs under the same RU in a 5G architecture, or a service initiated by the first UE 10 and expected to be processed by the MEC device 17.

Step S32: configuring the near-RT RIC to establish the F1-LBO routing xAPP to set a local breakout dedicated radio bearer (LBO DRB) for the URLLC service. In detail, in the 5G architecture, there will be a corresponding DRB for each service.

In compliance with a 3GPP PDU session management procedure, there is a standard indicating that a gNB-DU is responsible for allocating tunnel endpoint identifiers (TEIDs) of F1-U interface downlink (DL) GPRS tunneling protocol (GTP) for each DRB (TS 38.470), and a gNB-CU is responsible for allocating the up-link (UL) GTP TEID (TS 38.473) of the DU for each DRB. A transport bearer can be identified by using GTP-U TEID (TS 29.281) and IP address, for example, source TEID, target TEID, source IP address, and target IP address.

In addition, the GTP for user plane (GTP-U) TEID can be used to identify transport bearers (user plane PDU sessions), including not only core network sessions, but also dedicated radio bearer (DRB) sessions, and the present disclosure performs the F1-LBO in a DRB session. In addition, in order to comply with 3GPP standard, a GTP-U (TS 29.281) protocol must be used on an F1 interface between the gNB-DU and the gNB-CU.

Step S33: configuring the F1-LBO VNF module according to a traffic rule by the F1-LBO routing xAPP to establish a routing table. As mentioned above, in order to comply with 3GPP standard, a corresponding relationship between a first location and a second location of the LBO DRB needs to be defined in the routing table. Since an initiator of the URLLC service is the first UE 10, the first location can be a first TEID of the first UE 10, and the second location can be set according to a target of the URLLC service, for example, the second location can be the second TEID of the second UE 11, or can be an IP address of the MEC device 17.

Step S34: configuring the F1-LBO VNF module to establish an F1-LBO session between the first UE 10 and the second UE 11 according to the routing table, or to establish the F1-LBO session between the first UE 10 and a vCU-UP 170 executed by the MEC device 17 according to the routing table. It should be noted that vCU-UP 170 only passively recognizes the routing table.

In addition, in this step, if the target of the LBO DRB is the second UE 11, and the second UE 11 is connected to the second DU 13-2, the F1 LBO VNF module 160 establishes the F1-LBO session between the first UE 10 and the second UE 11 through the first DU 13-1 and the second DU 13-2. Therefore, as mentioned earlier, the F1 gateway 16 can be used to implement an LBO between the plurality of DUs.

Therefore, the original 5G architecture does not support a standard F1-LBO, and the above-mentioned DRBs need to be transmitted to the core network CN through the RU, DU, and CU, and then return to the CU and DU to finally reach the target location. However, the present disclosure can support lower microsecond-level application requirements, and complies with 3GPP NG-RAN, 5G core network (5GC) standards and O-RAN working group 3 near-RT RIC management interface standard to establish F1-LBO shortcuts.

Figure 4:
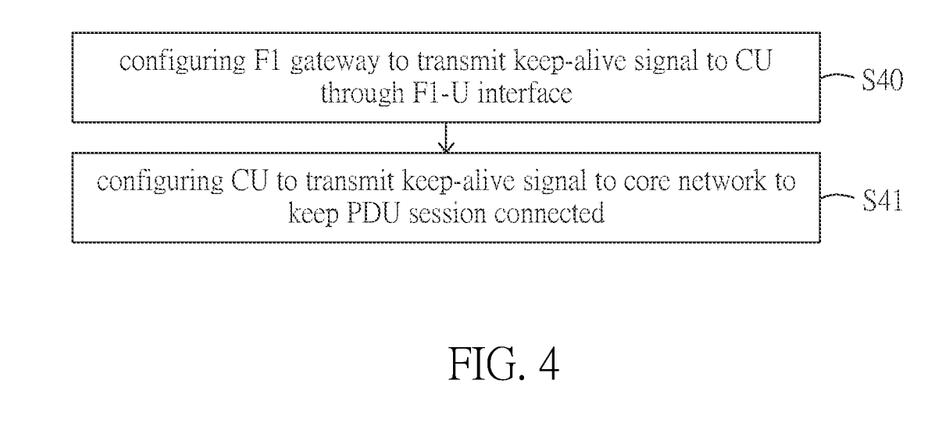
FIG. 4 is a flowchart of a connection maintaining mechanism according to the first embodiment of the present disclosure.

In addition, the present disclosure can also maintain the original packet data network (PDN) session when an F1-LBO mechanism is provided. Reference is further made to FIG. 4, which is a flowchart of a connection maintaining mechanism according to the first embodiment of the present disclosure.

As shown in FIG. 4, after the F1 gateway 16 executes the F1 LBO VNF module 160 to establish the F1-LBO session, the connection maintaining mechanism can perform the following step:

Step S40: configuring the F1 gateway to transmit a keep-alive signal to the CU through the F1-U interface.

In response to the CU receiving the keep-alive signal, the connection maintaining mechanism proceeds to step S41: configuring the CU to transmit the keep-alive signal to the core network to keep the PDU session connected. It should be noted that, in order to comply with GTP-U protocol and be compatible with 3GPP, an interval of sending the keep-alive signals on each path should not exceed 60 seconds.

Figure 5:
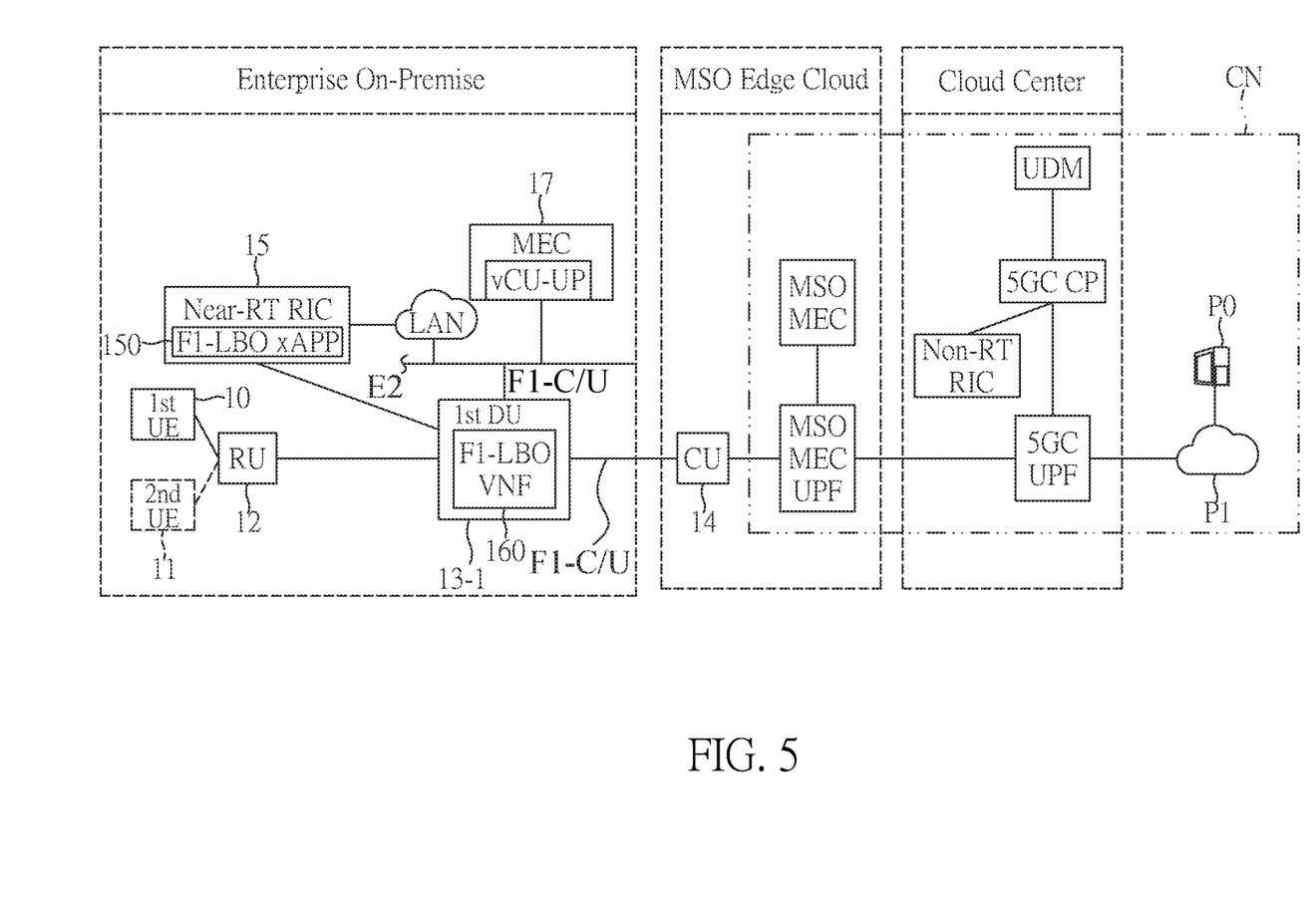
FIG. 5 is a functional block diagram of an LBO system according to a second embodiment of the present disclosure.

Reference is made to FIG. 5, which is a functional block diagram of a local breakout (LBO) system according to a second embodiment of the present disclosure. In the second embodiment, the same elements are denoted with the same reference numerals, and repeated descriptions are omitted. The difference from the first embodiment is that in the URLLC-LBO system 1 of the second embodiment, the F1 gateway 16 is removed, and the F1 LBO VNF module 160 is executed by the first DU 13-1 instead. In addition, in this embodiment, the first DU 13-1 is connected to the CU 14 and the MEC device 17 through a plurality of F1-C/U interfaces, respectively, and is connected to the near-RT RIC 15 through the E2 interface.

In the second embodiment, despite the lack of the F1 gateway 16 that can implement a scalability of the F1-LBO among the plurality of DUs, the first DU 13-1 can still be used to implement the F1-LBO shortcut that can be provided by the F1 LBO VNF module 160.

Therefore, the second embodiment of the present disclosure can meet the O-RAN working group 3 near-RT RIC management interface standard without modifying the original network equipment and UE.

Figure 6:
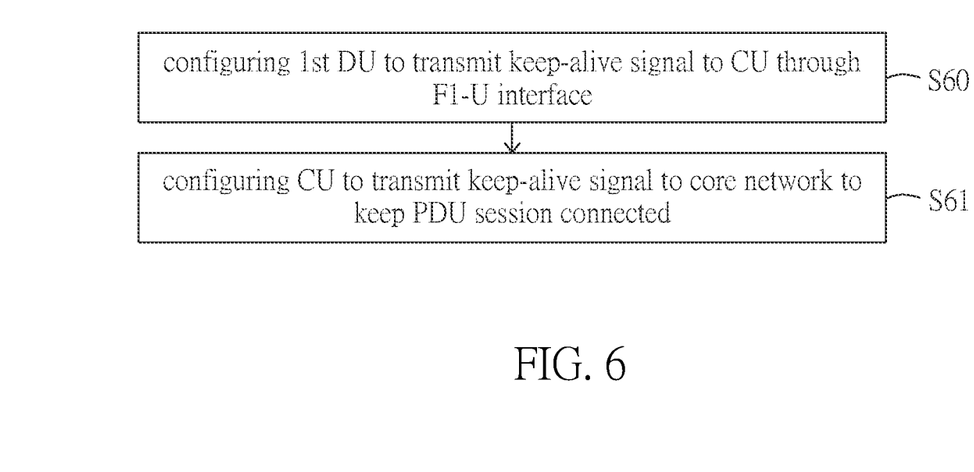
FIG. 6 is a flowchart of the connection maintaining mechanism according to the second embodiment of the present disclosure.

In addition, the second embodiment can also maintain the original PDN session when the F1-LBO mechanism is provided. Reference is further made to FIG. 6, which is a flowchart of a connection maintaining mechanism according to the second embodiment of the present disclosure.

As shown in FIG. 6, after the first DU 13-1 executes the F1 LBO VNF module 160 to establish the F1-LBO session, the connection maintaining mechanism can perform the following step:

Step S60: configuring the first DU 13 to transmit a keep-alive signal to the CU through the F1-U interface.

In response to the CU receiving the keep-alive signal, the connection maintaining mechanism proceeds to step S61: configuring the CU to transmit the keep-alive signal to the core network to keep the PDU session connected. Similarly, in order to comply with GTP-U protocol and be compatible with 3GPP, a frequency of sending the keep-alive signals on each path should not exceed 60 s.

Figure 7:
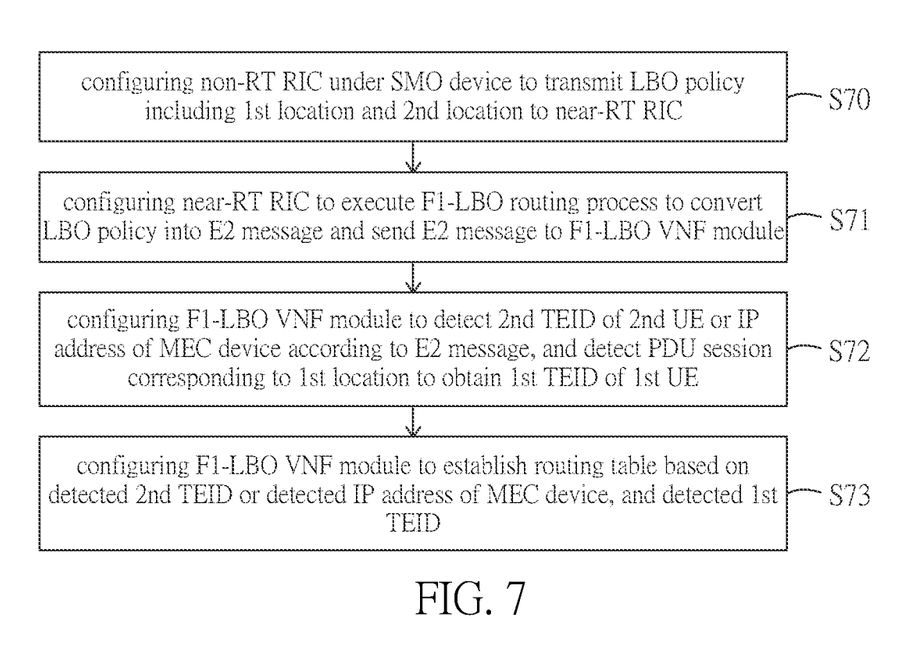
FIG. 7 is a flowchart of establishing a routing table of a dedicated radio bearer (DRB) through a near real-time radio access network intelligence controller (near-RT RIC) according to a third embodiment of the present disclosure.

Reference is further made to FIGS. 2 and 7. FIG. 7 is a flowchart of establishing a routing table of the DRB through the near-RT RIC according to a third embodiment of the present disclosure. As shown in FIGS. 2 and 7, the following descriptions further provide the detailed flow of establishing the routing table of the LBO DRB, and the flow includes the following steps:

Step S70: configuring a non-RT RIC under an SMO device to transmit an LBO policy including the first location and the second location to the near-RT RIC. As previously exemplified, depending on the requirements of the URLLC service, the first location can be a first TEID of the first UE 10, and the second location can be set according to the target of the URLLC service, for example, the second location can be the second TEID of the second UE 11, or can be an IP address of the MEC device 17, and the LBO policy can plan an LBO path from the first location to the second location.

In response to receiving the LBO policy, the flow proceeds to step S71: configuring the near-RT RIC to execute the F1-LBO routing process to convert the LBO policy into an E2 message and send the E2 message to the F1-LBO VNF module.

In response to receiving the E2 message, the flow proceeds to step S72: configuring the F1-LBO VNF module to detect the second TEID of the second UE or the IP address of the MEC device according to the E2 message, and detect the PDU session corresponding to the first location to obtain the first TEID of the first UE.

Step S73: configuring the F1-LBO VNF module to establish the routing table based on the detected second TEID or the detected IP address of the MEC device, and the detected first TEID.

In the third embodiment, since the core network CN does not have an ability to establish F1-LBO sessions, the present disclosure utilizes the virtual network function of the near-RT RIC complying with the O-RAN architecture to configure the traffic rule of the F1 LBO VNF module through the near-RT RIC according to the LBO policy. Therefore, the LBO DRB can be set for the URLLC service, and the routing table for the LBO DRB can be established.

In conclusion, the URLLC-LBO method and the URLLC-LBO system for the NG-RAN provided by the present disclosure are suitable for the F1 interface between the CU and the DU, can support lower microsecond-level application requirements, and can comply with 3GPP NG-RAN and 5GC standards, therefore, the URLLC-LBO method and the URLLC-LBO system can comply with O-RAN working group 3 near-RT RIC management interface standard to establish F1-LBO shortcuts without modifying the original network equipment and UE and UPF PDN session maintaining mechanism.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An ultra-reliable and low latency communications local breakout (URLLC-LBO) method for a next generation radio access network (NG-RAN), comprising:
    configuring a core network to establish a packet data unit (PDU) session between a first user equipment (UE) and the core network, wherein the PDU session passes through a radio unit (RU), a first distributed unit (DU) and a central unit (CU) between the first UE and the core network;
    configuring the first UE to establish a local ultra-reliable and low latency communications (URLLC) service;
    configuring a near-real-time radio access network intelligence controller (near-RT RIC) to establish an F1 local breakout (F1-LBO) routing process to set a local breakout dedicated radio bearer (LBO DRB) for the local URLLC service;
    configuring an F1-LBO virtual network function (VNF) module according to a traffic rule by the F1-LBO routing process to establish a routing table through the F1-LBO VNF module, wherein the routing table defines a relationship between a first location and a second location of the LBO DRB, the first location is a first tunnel endpoint identifier (TEID) of the first UE, and the second location is a second TEID of a second UE or an Internet protocol (IP) address of a multi-access edge computing (MEC) device; and
    configuring the F1-LBO VNF module to establish an F1-LBO session between the first UE and the second UE according to the routing table, or to establish the F1-LBO session between the first UE and a virtual central unit (vCU) user plane (UP) executed by the MEC device according to the routing table.

2. The URLLC-LBO method according to claim 1, further comprising:
    configuring an F1 gateway to execute the F1-LBO VNF module, wherein the F1 gateway is connected to the first DU, the CU, and the MEC device through a plurality of F1-C/F1-U interfaces, and is connected to the near-RT RIC through an E2 interface.

3. The URLLC-LBO method according to claim 2, wherein the F1 gateway is further connected to a second DU through one of the F1-C/F1-U interfaces, and in response to the second UE being connected to the second DU, the F1-LBO VNF module establishes the F1-LBO session between the first UE and the second UE through the first DU and the second DU.

4. The URLLC-LBO method according to claim 2, further comprising:
    in response to the F1 gateway executing the F1-LBO VNF module to establish the F1-LBO session, configuring the F1 gateway to transmit a keep-alive signal to the CU through the F1-U interface; and
    in response to receiving the keep-alive signal, configuring the CU to transmit the keep-alive signal to the core network to keep the PDU session connected.

5. The URLLC-LBO method according to claim 1, further comprising:
    configuring the first DU to execute the F1-LBO VNF module, wherein the first DU is connected to the CU and the MEC device through a plurality of F1-C/F1-U interfaces, respectively, and is connected to the near-RT RIC through an E2 interface.

6. The URLLC-LBO method according to claim 5, further comprising:
    in response to the first DU executing the F1-LBO VNF module to establish the F1-LBO session, configuring the first DU to transmit a keep-alive signal to the CU through the F1-U interface; and
    in response to receiving the keep-alive signal, configuring the CU to transmit the keep-alive signal to the core network to keep the PDU session connected.

7. The URLLC-LBO method according to claim 1, further comprising:
    configuring a non-real-time radio access network intelligence controller (non-RT RIC) under a service management and orchestration framework (SMO) device of the core network to transmit an LBO policy including the first location and the second location to the near-RT RIC;
    in response to receiving the LBO policy, configuring the near-RT RIC to execute the F1-LBO routing process to convert the LBO policy into an E2 message and send the E2 message to the F1-LBO VNF module;
    in response to receiving the E2 message, configuring the F1-LBO VNF module to detect the second TED of the second UE or the IP address of the MEC device according to the E2 message, and detect the PDU session corresponding to the first location to obtain the first TEID of the first UE; and
    configuring the F1-LBO VNF module to establish the routing table based on the detected second TEID or the detected IP address of the MEC device, and the detected first TEID.

8. An ultra-reliable and low latency communications local breakout (URLLC-LBO) system for a next generation radio access network (NG-RAN), comprising:
    a first user equipment (UE) configured to establish a local ultra-reliable and low latency communications (URLLC) service;

a core network configured to establish a packet data unit (PDU) session between the first UE and the core network;

a radio unit (RU) connected between the first UE and the core network;

a first distributed unit (DU) connected between the RU and the core network;

a central unit (CU) connected between the first DU and the core network;

a near real-time radio access network intelligence controller (near-RT RIC) configured to establish an F1 local breakout (F1-LBO) routing process to set a local breakout dedicated radio bearer (LBO DRB) for the local URLLC service; and an F1-LBO virtual network function (VNF) module connected between the first DU and the CU, wherein the F1-LBO routing process is executed to configure the F1-LBO VNF module according to a traffic rule to establish a routing table, the routing table defines a relationship between a first location and a second location associated with the LBO DRB, wherein the first location is a first tunnel endpoint identifier (TEID) of the first UE, and the second location is a second TEID of a second UE or an Internet protocol (IP) address of a multi-access edge computing (MEC) device; and wherein the F1-LBO VNF module is further configured to establish an F1-LBO session for the LBO DRB between the first UE and the second UE according to the routing table, or to establish the F1-LBO session between the first UE and a virtual central unit (vCU) user plane (UP) executed by the MEC device according to the routing table.

9. The URLLC-LBO system according to claim 8, further comprising:

an F1 gateway configured to execute the F1-LBO VNF module, wherein the F1 gateway is connected to the first DU, the CU, and the MEC device through a plurality of F1-C/F1-U interfaces, and is connected to the near-RT RIC through an E2 interface.

10. The URLLC-LBO system according to claim 9, wherein the F1 gateway is further connected to a second DU through one of the F1-C/F1-U interfaces, and in response to the second UE being connected to the second DU, the F1-LBO VNF module establishes the F1-LBO session between the first UE and the second UE through the first DU and the second DU.

11. The URLLC-LBO system according to claim 10, wherein, in response to the F1 gateway being configured to execute the F1-LBO VNF module to establish the F1-LBO session, the F1 gateway is further configured to transmit a keep-alive signal to the CU through the F1-U interface, wherein, in response to the CU receiving the keep-alive signal, the CU is configured to transmit the keep-alive signal to the core network to keep the PDU session connected.

12. The URLLC-LBO system according to claim 8, wherein the first DU is configured to execute the F1-LBO VNF module, and the first DU is connected to the CU and the MEC device through a plurality of F1-C/F1-U interfaces, respectively, and is connected to the near-RT RIC through an E2 interface.

13. The URLLC-LBO system according to claim 12, wherein, in response to the first DU being configured to execute the F1-LBO VNF module to establish the F1-LBO session, the first DU is further configured to transmit a keep-alive signal to the CU through the F1-U interface, wherein, in response to the CU receiving the keep-alive signal, the CU is configured to transmit the keep-alive signal to the core network to keep the PDU session connected.

14. The URLLC-LBO system according to claim 8, wherein a non-real-time radio access network intelligence controller (non-RT RIC) under a service management and orchestration framework (SMO) device of the core network is configured to transmit an LBO policy including the first location and the second location to the near-RT RIC, wherein, in response to receiving the LBO policy, the near-RT RIC is configured to execute the F1-LBO routing process to convert the LBO policy into an E2 message and send the E2 message to the F1-LBO VNF module;

wherein, in response to receiving the E2 message, the F1-LBO VNF module is configured to detect the second TEID of the second UE or the IP address of the MEC device according to the E2 message, and detect the PDU session corresponding to the first location to obtain the first TEID of the first UE, wherein, the F1-LBO VNF module is configured to establish the routing table based on the detected second TEID or the detected IP address of the MEC device, and the detected first TEID.

\* \* \* \* \*